Jan. 6. 1925
C. A. SPITTELL
1,521,796
BERRY BOX
Filed Dec. 16, 1921
2 Sheets-Sheet 2
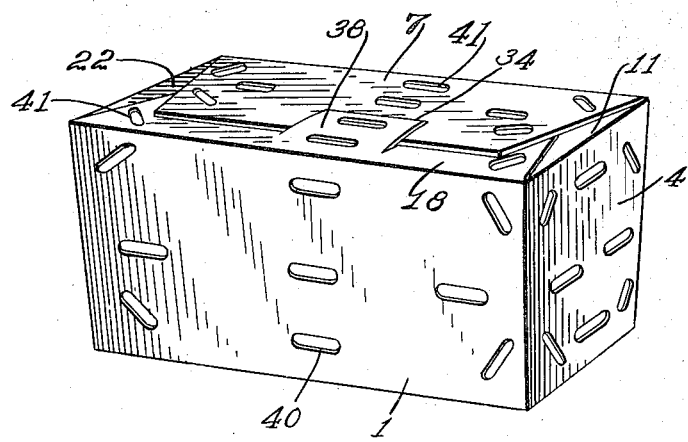
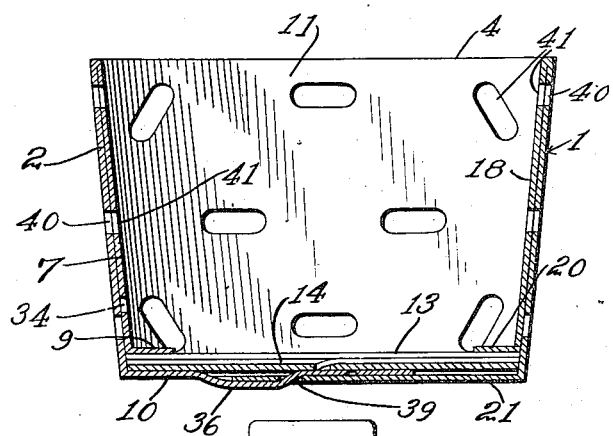
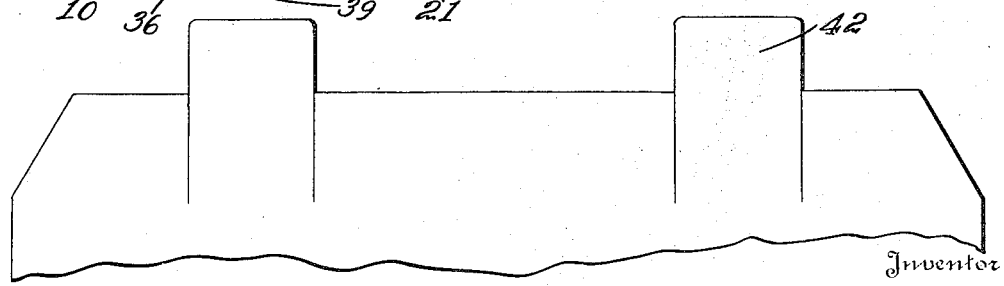
Inventor
C. A. Spittell.
By
Attorney Patented Jan. 6, 1925.

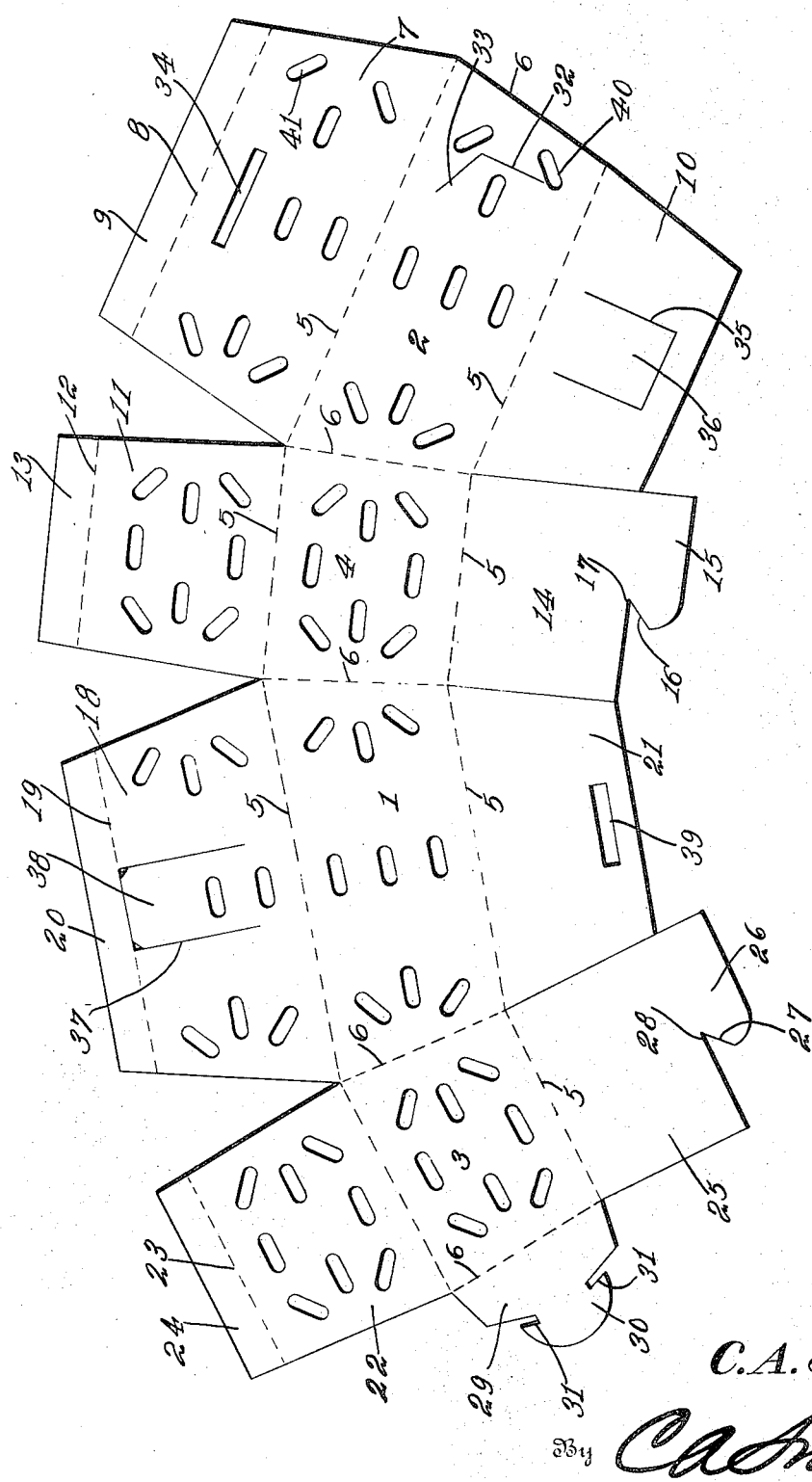

1,521,796

UNITED STATES PATENT OFFICE.

CHRISTIAN A. SPITTELL, OF NEWARK, NEW JERSEY.

BERRY BOX.

Application filed December 16, 1921. Serial No. 522,829.

*To all whom it may concern:*

Be it known that I, CHRISTIAN A. SPITTELL, a citizen of the United States, residing at Newark, in the county of Essex and State of New Jersey, have invented a new and useful Berry Box, of which the following is a specification.

This invention relates to berry boxes and the like, one of its objects being to provide a collapsible container which can be cut readily from stiff cardboard or like material and thus shipped conveniently and produced at low cost, it being possible to set up the box or container for use either as a closed container to prevent spilling of the contents or as a reenforced open container capable of withstanding rough handling.

Another object is to provide a container of this character which is thoroughly ventilated so as to reduce the tendency of the contents to decay.

Another object is to provide a container the cover of which can be used as a reenforcement for the walls when it is desired to use an uncovered container, the cover being apertured so as not to interfere with the proper circulation of air through the walls when said walls are reenforced by the cover.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a plan view of a blank from which a container can be produced.

Figure 2 is a perspective view of the container, the cover sections being shown interengaged to retain the contents of the container.

Figure 3 is a transverse section through the container showing the cover members used as reenforcements for the bottom and walls of the container.

Figure 4 is a plan view of a portion of a slightly modified form of blank.

Referring to the figures by characters of reference 1 and 2 designate the side walls of the container and 3 and 4 designate the end walls. These are formed in one continuous strip as shown in Figure 1, the upper and lower margins of the walls being indicated by the dotted lines 5, while the end margins of the walls are indicated by the dotted lines 6. If the container is to be of the nestling type wherein the bottom is smaller than the top, the lines 6 will converge as shown in Figure 1.

Extending from the long margin 5 of the wall 2 is an integral flap 7 the end edges of which preferably converge away from the wall 2 as shown in Figure 1 while the free longitudinal portion of this flap is adapted to be bent along the line 8 thus to provide a reenforcing flange 9. The opposite margin 5 of the wall 2 has a flap 10 extending therefrom the end edges of which converge away from the wall 2 as shown.

The end wall 4 has a flap 11 extending from that margin 5 thereof nearest the flap 7 and this flap 11 is adapted to be folded along its outer end portion upon the line 12, thus to provide a reenforcing flange 13. Another flap 14 is extended from the opposite margin 5 of the wall 4, its side edges being preferably parallel as shown and there being a tongue 15 extending from the outer end of this flap 14, one end of the tongue being undercut as shown at 16 and providing a laterally extending crotch 17.

Extending from that margin 5 of the wall 1 nearest the flap 11 is a flap 18 the sides of which converge outwardly, the outer end portion of this flap being adapted to be bent along the line 19 so as to provide a reenforcing flange 20. Another flap 21 is extended from the opposite margin of the wall 1 and also has its side edges converging outwardly. The end wall 3 has a flap 22 corresponding with the flap 11 and adapted to be bent along the line 23 to provide a reenforcing flange 24. From the opposite margin of this end wall 3 is a flap 25 the side edges of which are preferably parallel, there being a tongue 26 at the outer end of this flap 25. The said tongue is undercut as at 27 so as to provide a crotch 28 corresponding with that shown at 17.

An end tongue 29 is extended from the free end of the wall 3 and has a head 30 partly separated from the tongue 29 by inwardly extending slots 31.

The end wall 2 is provided near its free end with a transverse slot 32 from one end of which extends an obliquely disposed slot 33. These slots 32 and 33 are adapted to receive the tongue 29 when the blank is bent to form the finished container.

Formed longitudinally wihtin the flap 7 close to the line 8 is a slot 34 and the opposed flap 10 has incisions 35 cut thereinto to produce a tongue 36.

The flap 18 has incisions 37 therein adapted to produce a bendable tongue 38 and formed in the opposed flap 21 of the wall 1 is a longitudinal slot 39 located close to the outer edge of the flap. The tongue 38 is so proportioned that it can be inserted into the slot 34 when the blank is bent to produce a container and the slot 39 is so proportioned as to receive the tongue 36 under like conditions.

Formed within the walls 1, 2, 3, and 4 are groups of apertures 40 and formed within the flaps 18, 7, 22 and 11 are groups of apertures 41 corresponding with the apertures in the walls from which said flaps extend. Thus when these flaps are bent inwardly against the inner surfaces of the walls as will be hereinafter explained, the apertures 41 in the flaps will register with the apertures 40 in the walls and the free circulation of air through the walls will not be interfered with.

When it is desired to use the container the blank shown in Figure 1 is folded along the lines 6 and the tongue 29 is inserted through the slots 32 and 33 and adjusted so that the ends of the slot 32 will become seated within the slots 31 in the tongue 29. The flaps 14 and 25 are then bent inwardly along the margin 5 so that the tongues 26 will interlock, the crotch back of one tongue fitting into the crotch back of the other tongue. The flap 21 is then folded along its margin 5 and is extended between the flap 10 and its tongue 26 after said flap 10 has been folded along its margin 5. The tongue 36 is then inserted through the slot 39 so that its free end will lie between the flap 21 and the flaps 14 and 25 interlocked thereabove. Thus the formation of the bottom of the container will be completed.

If the container is to be closed so as to prevent its contents from spilling out in transit or while being handled, the flaps 11 and 22 are bent inwardly so as to lap after the container has been filled after which the flap 7 is bent down onto the flap 18 and inserted between said flap 18 and the tongue 38. The free end of the tongue is then inserted downwardly through the slot 34 and laterally under the flap 7. Consequently the container will be closed and there is no danger of losing its contents. At the same time air can circulate freely through the container and will retard decomposition of the contents.

Should it be desired to use an open container reenforced so as to withstand rough usage, the flaps 7, 11, 18 and 22 can be pressed downwardly into the container and against the inner faces of the corresponding walls of the container, the flanges 9, 13, 20 and 24 being bent along the lines 8, 12, 19 and 23 so that said flanges will rest upon the bottom of the container as shown particularly in Figure 3. With the parts thus positioned the openings within the flaps will coincide with the openings in the walls and air will be free to circulate through the container as before.

While it is preferred to arrange the tongues and slots as has been shown at 36, 39, 34 and 38, the parts can, if preferred, be arranged as shown in Figure 4 wherein the tongues 42 are extended beyond the longitudinal edges of the flaps. Likewise, as shown in Figure 4, two tongues can be provided in a flap instead of one, especially if the container is of large size.

What is claimed is:—

A container formed in a single blank of bendable material comprising side and end walls, interengaging means upon one end and one side wall for holding the walls assembled, bottom flaps extending from the walls along one margin thereof, tongues extending from two opposed flaps provided with undercut ends, said tongue carrying flaps being bendable into substantial alinement, the tongues being movable into lapped relation with their undercut ends interengaging, a transverse slot in one of the remaining flaps, and a tongue cut from the other remaining flap, the last named flap containing the tongue being positioned upon the inner surface of the slotted flap and said tongue being extended along the outer surface of the slotted flap and thence inwardly through the slot and into position between the slotted flap and the flaps having the interfitting tongues, to be held at its free end between the superposed flaps.

In testimony that I claim the foregoing as my own, I have hereto affixed my signature in the presence of two witnesses.

CHRISTIAN A. SPITTELL.

Witnesses:
GEORGE H. HONEYWELL,
CLIFFORD HOLMES.